United States Patent
Daynes et al.

(10) Patent No.: US 7,065,755 B2
(45) Date of Patent: Jun. 20, 2006

(54) METHOD AND APPARATUS FOR REMOVING CLASS INITIALIZATION BARRIERS FROM SHARED COMPILED METHODS

(75) Inventors: Laurent P. Daynes, Sunnyvale, CA (US); Grzegorz J. Czajkowski, Mountain View, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 671 days.

(21) Appl. No.: 10/010,057

(22) Filed: Dec. 4, 2001

(65) Prior Publication Data

US 2004/0015921 A1 Jan. 22, 2004

Related U.S. Application Data

(60) Provisional application No. 60/276,409, filed on Mar. 15, 2001.

(51) Int. Cl.
*G06F 9/45* (2006.01)
(52) U.S. Cl. ...................................................... 717/148
(58) Field of Classification Search ................ 717/153, 717/154, 162, 163–165, 148; 345/420; 713/300; 700/5
See application file for complete search history.

(56) References Cited

U.S. PATENT DOCUMENTS

| | | | | |
|---|---|---|---|---|
| 5,729,710 A * | 3/1998 | Magee et al. | ............... | 711/203 |
| 5,884,083 A * | 3/1999 | Royce et al. | ............... | 717/143 |
| 6,067,413 A * | 5/2000 | Gustafsson et al. | ......... | 717/114 |
| 6,085,034 A * | 7/2000 | Danforth | .................... | 717/108 |
| 6,195,754 B1 * | 2/2001 | Jardine et al. | .............. | 713/324 |
| 6,279,109 B1 * | 8/2001 | Brundridge | ..................... | 713/2 |
| 6,570,564 B1 * | 5/2003 | Sowizral et al. | ............ | 345/420 |
| 6,704,927 B1 * | 3/2004 | Bak et al. | .................... | 717/151 |
| 6,813,522 B1 * | 11/2004 | Schwarm et al. | .............. | 700/5 |
| 6,829,761 B1 * | 12/2004 | Sexton et al. | ............... | 717/165 |
| 2001/0003824 A1 * | 6/2001 | Schnier | ...................... | 709/203 |

FOREIGN PATENT DOCUMENTS

WO    WO 01/61486 A2 *  2/2001

OTHER PUBLICATIONS

Czajkowski, et al., "Multitasking without comprimise: a virtual machine evolution", ACM SIGPLAN Notices, Proceedings of the 16th ACM SIGPLAN conference on Object oriented programming, systems, languages, and applications, vol. 36: 11, Oct. 2000.☐☐*

* cited by examiner

*Primary Examiner*—Wei Y. Zhen
(74) *Attorney, Agent, or Firm*—Park, Vaughan & Fleming, LLP; Edward J. Grundler

(57) ABSTRACT

The invention describes a method an apparatus to minimize the costs introduced in the native code of a method M in order to make it executable (concurrently or serially) by multiple tasks, wherein M's native code is produced by the dynamic compiler of a multitasking virtual machine. One embodiment of the present invention describes a mechanism that annotates the shared runtime representation of classes with information that identifies the particular event that triggered the initialization of these classes, and in particular, if that event is the execution of class initialization barrier from a method of another class. These annotations are then used during each dynamic compilation of a method M of a class C to determine when native code corresponding to a class initialization barrier needs to be generated in the task re-entrant native code produced by the dynamic compiler for M.

45 Claims, 4 Drawing Sheets

METHOD AND APPARATUS FOR REMOVING CLASS INITIALIZATION BARRIERS FROM SHARED COMPILED METHODS

RELATED APPLICATION

This application hereby claims priority under 35 U.S.C. §119 to a Provisional Patent Application entitled, "The Design of MVM—a Multitasking Virtual Machine," filed Mar. 15, 2001 by inventors Grzegorz J. Czajkowski and Laurent P. Daynes (Application No. 60/276,409).

The subject matter of this application is related to the subject matter in co-pending non-provisional applications by the same inventors as the instant application entitled, "Method and Apparatus to Facilitate Sharing Instruction Code in a Multitasking Virtual Machine," having Ser. No. 10/043,801, and filing date 10 Jan. 2002 and "Method and Apparatus for Class Initialization Barriers and Access to Class Variables in Multitasking Virtual Machines," having Ser. No. 09/975,145, and filing date 9 Oct. 2001.

BACKGROUND

1. Field of the Invention

The present invention relates to computer instruction code. More specifically, the present invention relates to a method and an apparatus for removing class initialization barriers from shared compiled methods.

2. Related Art

Computer programs written in languages such as JAVA™ are compiled into a platform-independent code, which is executed on a virtual machine, such as a JAVA VIRTUAL MACHINE (JVM). A program that has been compiled into a platform-independent code has the advantage that it can execute on any virtual machine that supports the platform-independent code regardless of what type of underlying central processing unit and native code are used to implement the virtual machine. The terms JAVA, JVM, and JAVA VIRTUAL MACHINE are trademarks or registered trademarks of SUN Microsystems, Inc. of Palo Alto, Calif.

A virtual machine typically includes an interpreter, which interprets the platform-independent code into native code to perform the desired operations. Interpreting the platform-independent code is an inherently slow operation. Therefore, many virtual machine implementations also include a dynamic compiler, which dynamically compiles the platform-independent code at runtime into the native code for the machine being used to host the virtual machine. Compiling the platform-independent code into the native code for the host machine can reduce the execution time of the program and, therefore, increase throughput.

Virtual machines for object-oriented programming languages with dynamic class loading typically load the code of a class when a program resolves a symbolic reference to that class for the first time. The class needs to be initialized subsequently when the program uses it for the first time. Loading and initialization of a class are two separate events. Initialization of a class may never take place even though the class has been loaded before. In the case of the Java programming language, the initialization of a class includes executing the class's static initializer, which brings the class's variables (also known as the static variables) to a well-defined initialized state. A virtual machine implementation may choose to set a class to the initialized state upon its loading when no action is required to initialize that class. For instance, in the Java programming language, no action is required to initialize a class when this class has no declared static initialization sequence, and either no non-final static variables, or non-final static variables that are all declared to be set to a default value. In this case, a virtual machine implementation can benefit from setting such initialization-less classes to the initialized state upon class loading.

A class initialization barrier is a sequence of native instructions that calls the virtual machine's runtime to initialize a class if the class is not already initialized. Class initialization barriers are included in the implementation of those platform-independent instructions that may result in the very first use of a class (in the case of the Java programming language, there are four such instructions: getstatic, putstatic, invokestatic, new). The implementation of a platform-independent instruction can come in two flavors: (i) as a sequence of instructions that is part of the implementation of an interpreter of platform-independent instructions, (ii) or as a sequence of instructions generated by a dynamic compiler from platform-independent instructions.

Dynamic compilers have two ways to eliminate class initialization barriers. Simple static analysis (complex static analyses are most of the time out of question because of their cost, which is unacceptable for a runtime compiler), and code patching.

Dynamic compilers take advantage of their knowledge about the current runtime state of an executed program to eliminate class initialization barriers at compile-time: typically, class initialization barriers are not emitted for classes that have been initialized. For those cases where a class hasn't been initialized by the time the compilation takes place, self-rewriting code is generated instead in order to eliminate the class initialization barriers at execution time.

In order to save processing and memory, a multitasking virtual machine (MVM) aims at sharing as much of the runtime representation of a class as possible between tasks. Targets for sharing include the platform-independent code, the meta-data describing the class, and the native code produced by the dynamic compiler. Sharing the latter across sequential or concurrent execution of a program offers many advantages: it factors out the costs of runtime compilations, it eliminates the need for interpretation since compiled code is immediately available, and it reduces the space overhead of compiled methods when platform-independent programs are run simultaneously.

Unfortunately, sharing compiled code invalidates current class initialization barrier removal techniques because of dynamic loading: classes may be loaded in different order by different programs, or even by multiple executions of the same program. Therefore, an assumption that is correct for one execution (e.g., class A is initialized) may be incorrect in another. Because of this, class initialization barriers can be omitted only if the order of class initialization is guaranteed to be always the same for all possible executions of any programs using these classes.

Class initialization barrier elimination is also important to enable some optimization techniques, such as, the inlining of static methods. Inlining can bring significant performance gains, especially for methods that are frequently used. Most dynamic compilers do not attempt to inline a method if its class hasn't been initialized by the time the compilation takes place. If class initialization barriers can be eliminated for a particular static method call site, then it is possible to inline the method at this call site (provided that other inlining conditions apply as well).

What is needed is a method and an apparatus, which allows removal of class initialization barriers from shared compiled methods that do not exhibit the problems defined above.

SUMMARY

One embodiment of the present invention describes a mechanism that determines during the dynamic compilation of a method M of a class C if a class initialization barrier can be omitted in the native code produced by the compilation of M based on annotations made to classes during their initialization. The mechanism works by first annotating the shared runtime representation of classes that are initialized during the startup sequence of the very first task executed by the multitasking virtual machine with information that identify the particular event that triggered the initialization of these classes, and in particular, if that event is a class initialization barrier from a method of another class. Classes initialized during the startup of the first task executed by the multitasking virtual machine are called "bootstrap" classes. Irrespective of the task executed, bootstrap classes are always initialized in the same order, and their initialization is always triggered by the same events. Classes that are initialized after the startup sequence of the first task executed by the multitasking virtual machine have a "blank" annotation. The annotation of a class already annotated is left unchanged by subsequent initialization of the class by other tasks (in a multitasking virtual machine, a class can be initialized up to one time per-task executed by the virtual machine). Annotations are then used during runtime compilation of a method M of a class C by any tasks to determine if a class initialization barrier site can cause the initialization of class D targeted by the class initialization barrier. If D's annotation is blank, the mechanism cannot tell whether the class initialization barrier can be omitted, and the dynamic compiler must rely on other means to decide if it can omit the barrier. If D's annotation indicates that D is a bootstrap class, native code for the class initialization barrier is emitted only if D's annotation further indicates that the class initialization barrier site may have triggered D's initialization.

In one embodiment of the present invention, a class is annotated when its initialization state is atomically set to the fully initialized state. When calling the multitasking virtual machine runtime to initialize a class D, a class initialization barrier passes information that identifies, more or less exactly, the location of the initialization barrier. This information is carried by the multitasking virtual machine until class D becomes fully initialized, at which point the information is used to annotate class D. If initialization of class D is triggered by a event different than a class initialization barrier, this information is carried by the multitasking virtual machine until class D fully initialized, at which point the information is used to annotate class D.

In one embodiment of the present invention, the annotation to a class C is a pointer to the shared runtime representation of a class. A NULL pointer value indicates a blank annotation. A pointer to the shared runtime representation of any class indicates that C is a bootstrap class. A pointer to the shared runtime representation of a class D, such that D is different from C, indicates that a class initialization barrier of any method of D may have triggered C's initialization. A pointer to the shared runtime representation of class C itself indicates that C's initialization wasn't triggered by a class initialization barrier.

In one embodiment of the present invention, the annotation to a class C is a pointer to the shared representation of a method M. A NULL pointer value indicates a blank annotation. A pointer to the shared runtime representation of any method indicates that C is a bootstrap class. A pointer to the shared runtime representation of a method M of a class D, such that D is different from C, indicates that a class initialization barrier of method M of D may have triggered C's initialization. A pointer to a non-NULL value chosen so that the value cannot represent a pointer to the shared runtime representation of any method indicates that a class initialization barrier did not trigger C's initialization.

In one embodiment of the present invention, a dynamic compilation of a method M of a class C does not generate the native code of a class initialization barrier that targets a class D if C and D are the same. The barrier is unnecessary in this case because in order to execute M, C (and, therefore D) must be already initialized.

In one embodiment of the present invention, a dynamic compilation of a method M of a class C does not generate the native code of a class initialization barrier that targets a class D if C inherits from D. The barrier is unnecessary in this case because in order to execute M, C must be already initialized, and the class C inherits directly from must be initialized before C is initialized.

In one embodiment of the present invention, a dynamic compilation of a method M of a class C does not generate the native code of a class initialization barrier that targets a class D if D is initialization-less (see [0006]).

BRIEF DESCRIPTION OF THE FIGS.

DETAILED DESCRIPTION

Figure 1:
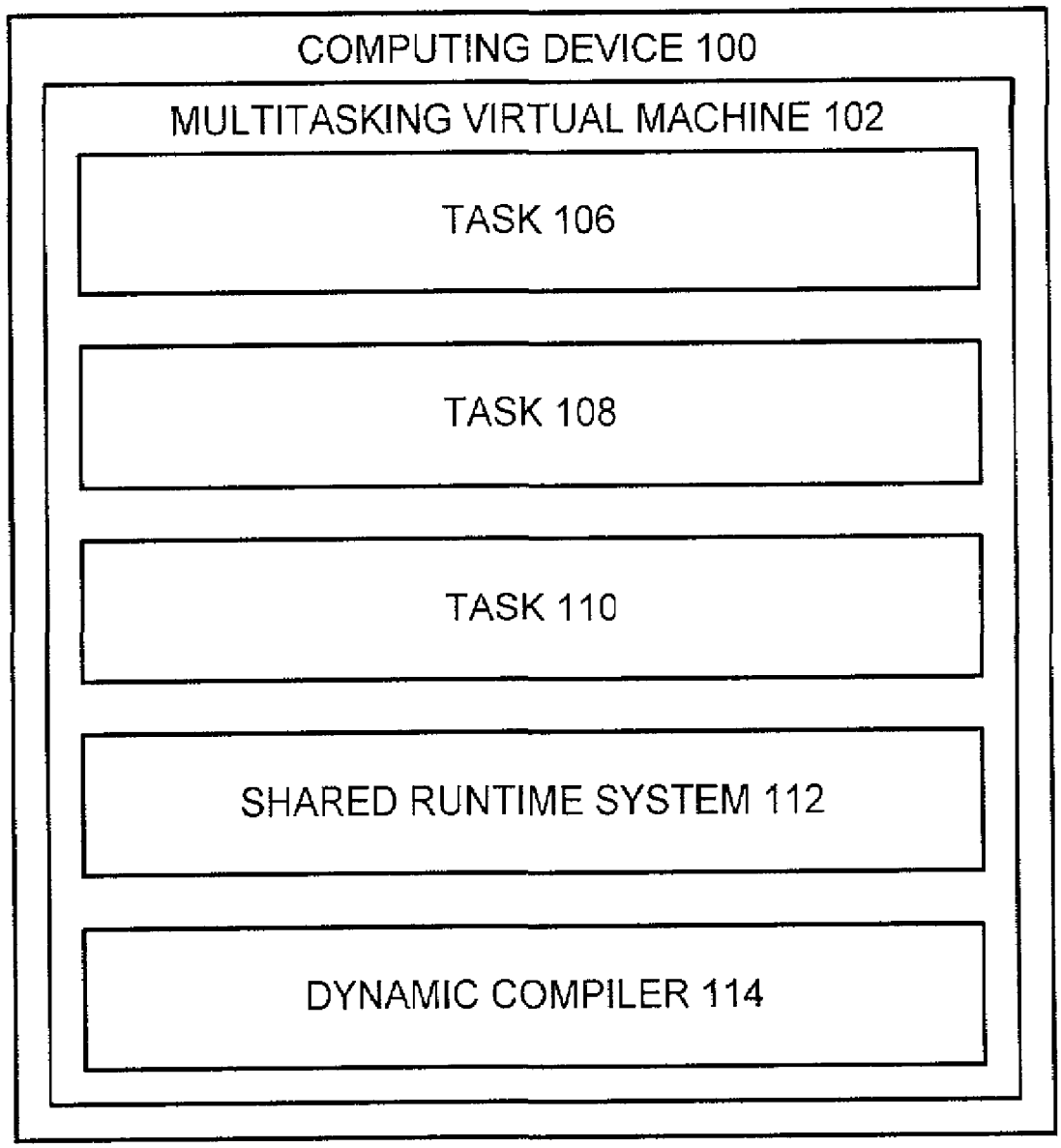
FIG. 1 illustrates computing device 100 including multitasking virtual machine 102 in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Overview

The present invention contains a mechanism to annotate classes with information that help identifying the event that triggered their initialization, and a simple set of tests that use this information, among others, to establish when the generation of a class initialization barrier can be omitted when compiling a method of a class into native code that can be shared between multiple tasks of a multitasking virtual machine. One advantage of avoiding the generation of a class barrier initialization is allowing method inlining. The information classes are annotated with take advantage of the initialization order of classes that are initialized during the bootstrap sequence of a task of the multitasking virtual machine, called hereafter bootstrap classes. The following description details some background on bootstrap classes, how and when they are initialized, and how classes are represented in a multitasking virtual machine, before detailing the annotation mechanism and how it is used to determine if code must be generated for a class initialization barrier at compile-time.

A virtual machine always performs a bootstrap sequence that brings the virtual machine to a state where it can start executing the instructions of a platform-independent program, which it has been instructed to execute.

A multitasking virtual machine typically uses two bootstrap methods: a heavyweight one that is used when the multitasking virtual machine is launched to execute its first program; and a lightweight bootstrap sequence for any subsequent programs the virtual machine is instructed to execute. The heavyweight bootstrap sequence is analogous to the bootstrap sequence of standard (i.e., non multitasked) virtual machines. The lightweight bootstrap sequence is semantically equivalent to the heavyweight one, but much faster. It establishes an execution context that is specific to the new program and that isolates it from any interference with other programs that the multitasking virtual machine may be executing simultaneously.

In both cases, the bootstrap sequence requires initializing a mandatory set of platform-independent classes essential to the execution of the virtual machine itself. These classes are known as the "bootstrap" classes and are a subset of what is commonly called the "core" classes. Initializing a class consists of executing a, potentially empty, sequence of instructions that brings the class, and in particular, its variables, to an initial state where the class can be used by a program. In the case of the Java programming language, the initialization of a class consists of executing the static initializers and the initializers for static variables declared in the class.

The order in which the bootstrap classes are initialized is fixed and always the same for every execution of any platform-independent programs (for a given version of the virtual machine and of the core classes). The present invention takes advantage of this fact to eliminate class initialization barriers directed at bootstrap classes at compile-time. Not all class initialization barriers to bootstrap classes can be eliminated though, since a multitasking virtual machine, in contrast to a non-multitasking virtual machine, may execute a compiled method at bootstrap.

A multitasking implementation of the virtual machine typically splits the runtime representation of a class into two sets of objects: one that can be shared by all programs it executes, and one that is private to each program, and replicated for each program. In the case of a virtual machine for the JAVA programming language, bytecodes, constant pools, methods, fields and exception tables are examples of what is shared between programs, whereas, static variables, class initialization states, and class loader objects are examples of what is replicated for each program. The construction of the shared part of the runtime representation of a class is done the first time the class is loaded by a program. In particular, the shared part of the representation of a bootstrap class is built only when the multitasking virtual machine is started.

By definition, the bootstrap sequence of all tasks, and in particular, of the first task executed by a multitasking virtual machine, is a sequence of operations performed serially (i.e., non-concurrently) by the virtual machine before the task is ready to execute the program it was instructed to run, and before the task starts the execution of new threads of control that may create concurrency. In other words, the bootstrap sequence of a task is concurrency-free. Three properties of a multitasking virtual machine make both the order in which bootstrap classes are initialized, and the event that triggers the initialization of each bootstrap class, task-independent. These properties are:

there is no concurrency during the bootstrap of a task executed by the multitasking virtual machine;

the effect of a task are strictly isolated from other tasks; and, all programs executed by the multitasking virtual machine are forced to use the same binary copy of bootstrap classes.

The present invention augments the shared runtime representation of each class C with a reference to an object called the initializer of C, which contains information that identify, more or less precisely, the event that triggered the initialization of C. However, the dynamic compiler cannot rely on the initializer of non-bootstrap classes to decide the elimination of a class initialization barrier since the initializer of such classes is not task-independent. For this reason, the annotation mechanisms leave the initializer of any classes initialized outside of the bootstrap sequence blank, which translates into setting the initializer of such classes to the NULL pointer value.

In all cases, the value of the initializer of a class is constant across all tasks: either it is a bootstrap class, in which case the class is always triggered by the same event and the initializer of the class always point to the same object that represents that event; or it is not a bootstrap class, and the value of its initializer must always be NULL. For this reason, the initializer of a class needs to be set only once, upon the first time the class is initialized. One way to achieve this is to maintain in a global variable of the multitasking virtual machine a Boolean value that indicates whether the bootstrap sequence of the first task is completed. Class initialization consults this variable to decide whether to assign the initializer of a class or not. The following illustrates a function that may be used to set the initializer of the class when the class is atomically set to the fully initialized state:

```
set_initializer(SharedRuntimeClassRepresentation
   C, Object X) {
        if (in_first_bootstrap &&
   initializer(C) ==NULL) {
                initializer (C) =X;
```

-continued

```
    }
}
```

The code above assumes that, upon creation of a shared runtime class representation, its initializer field is set to the NULL value.

The value of the initializer of a class is specified by the event that triggers the initialization of the class, and carried by the multitasking virtual machine until the class is atomically set to the fully initialized state. Class initialization is triggered either from a class initialization barrier of a method that is being executed, or directly by the virtual machine runtime. Examples of the latter case include initializing the super class of a class that is being initialized, or initializing a class because the virtual machine runtime needs the class to be initialized at a well-defined time.

The invention allows two types of value for the initializer of a bootstrap class: a pointer to the shared runtime representation of a class, or a pointer to the shared runtime representation of a method. In both cases however, the initializer of a non-bootstrap class is always set to a NULL pointer value, and the initializer of a bootstrap class C whose initialization is not triggered by a class initialization barrier is set the pointer to the shared representation of C itself. In the latter case, any other encoding is allowed as long as it is guaranteed to be distinguishable from the encoding of any initializer of a bootstrap class whose initialization is triggered by a class initialization barrier. The following describes in detail the two favored ways to encode the initializer of a class, and how, in each case, this information is used by a dynamic compiler to decide on generation of the native code for a class initialization barrier when compiling a method.

A multitasking virtual machine may assign the pointer to the shared runtime representation of class D to the initializer of a bootstrap class C when a class initialization barrier of a method of D triggers the initialization of C.

Given this, a dynamic compiler can use the simple following sequence of tests to determine if a class initialization barrier can be omitted from the compiled code of a method, so that multiple programs can share this compiled code. C is the class of the method M being compiled, and X is the class being targeted by a platform-independent instruction that may trigger the initialization of X. The dynamic compiler can omit the generation of a class initialization barrier for such instructions if the following function returns false:

```
boolean needs_CIB(X, C) {
    if (X == C) {                                    // Case 1
        return false;
    } else if (X is superclass of C) {               // Case 2
        return false;
    } else if ( (initializer(X) !=NULL) && (initializer(X)
?= C)) {                                             // Case 3
        return false;
    }
        return true;                                 // Case 4
}
```

Case 1. X and C are the same class. Since methods can only be invoked if the class that defined them is already initialized, barriers that target the class that defines the method that includes them are unnecessary. In other words, since m is a method of X, class initialization barriers that apply to X within m are unnecessary.

Case 2. C inherits from X (i.e., X is a super-class of C). The initialization of a class requires the initialization of all of its superclasses beforehand (since they participate in the definition of the class). Since m can only be executed once C is initialized (see comment on case 1), it follows than m can only be executed if C's superclass, and in particular X, are already initialized. Hence, barriers that target superclasses of the class that defines the method that includes them are unnecessary. In other words, since m is a method of subclass of X, class initialization barriers that apply to X within m are unnecessary.

Case 3. (initializer(X)!=NULL) && (initializer(X)!=C) X's initializer is not NULL, which means that X is a bootstrap class. In that case, a class initialization barrier is needed only if C is the initializer of X, since the method M may be the method that triggered X's initialization.

Note that this test encompasses the case where initializer (X)== X: since X!=C because of case 1, initializer(X)==X implies that the (initializer(X)!=NULL && initializer(X) !=C) is true. Therefore, when the value of initializer(X) is X itself, the function needs_CIB returns false and no native code will be generated by the dynamic compiler for this barrier. This is the desired effect when X is a bootstrap class that is not initialized by a class initialization barrier (as indicated by initializer(X)==X), since, in that case, no method can ever trigger the initialization of X.

Case 4. In the absence of any other information, the runtime compiler must be conservative and must emit the native code for a class initialization barrier.

A multitasking virtual machine may assign the pointer to the shared runtime representation of method m to the initializer of a bootstrap class C when a class initialization barrier of method M triggers the initialization of C. Using methods instead of classes for annotating bootstrap classes enables to gain in precision, and potentially decrease the number of class initialization generated by the runtime compiler.

The method needs_CIB is changed as follows to reflect this more precise variation:

```
boolean needs_CIB(X,M) {
    if (X == M.method_holder()) {            // case 1
        return false;
    } else if ( X is superclass M.method_holder()) {
                                             // case 2
        return false;
    } else if (initializer(X) !=NULL &&
initializer (X) !=M) {                       // case 3
        return false;
    }
        return true;                         // case 4
}
```

Under this approach, M is the method being compiled, M.method_holder( ) denotes the class that defines method M, and X is the class being targeted by a class initialization barrier of M.

As said earlier, the multitasking virtual machine may take advantage of initialization-less classes to avoid generating class initialization barrier for instruction that applies to such class, irrespectively of whether the class is a bootstrap class or not. In this case, a multitasking virtual machine set the initialization state of the initialization-less class to fully initialized upon its loading. In order to avoid generating class initialization barrier code against an initialization-less class C in compiled methods, it is enough to set the value of C's initializer to C itself. That way, C will always fall in case 3 of each of the needs_CIB functions described above. This technique works irrespectively of the type of initializer information chosen for bootstrap class (i.e., a pointer to a shared runtime representation of a class, or a pointer to a shared runtime representation of a method).

Computing Device

FIG. 1 illustrates computing device 100 including multitasking virtual machine 102 in accordance with an embodiment of the present invention. Computing device 100 can generally include any type of computer system, including, but not limited to, a computer system based on a microprocessor, a mainframe computer, a digital signal processor, a portable computing device, a personal organizer, a device controller, and a computational engine within an appliance.

Multitasking virtual machine 102 is a virtual machine, which has multitasking capability. As shown if FIG. 1, multitasking virtual machine 102 includes shared runtime system 112, tasks 106, 108, and 110, and dynamic compiler 114. Tasks 106, 108, and 110 are representative of a task load. A practitioner with ordinary skill in the art will readily recognize that multitasking virtual machine 102 can include any number of tasks, depending only on the resources available within computing device 100. Dynamic compiler 114 compiles platform-independent codes into the native code for computing device 100.

Multitasking Virtual Machine

Figure 2:
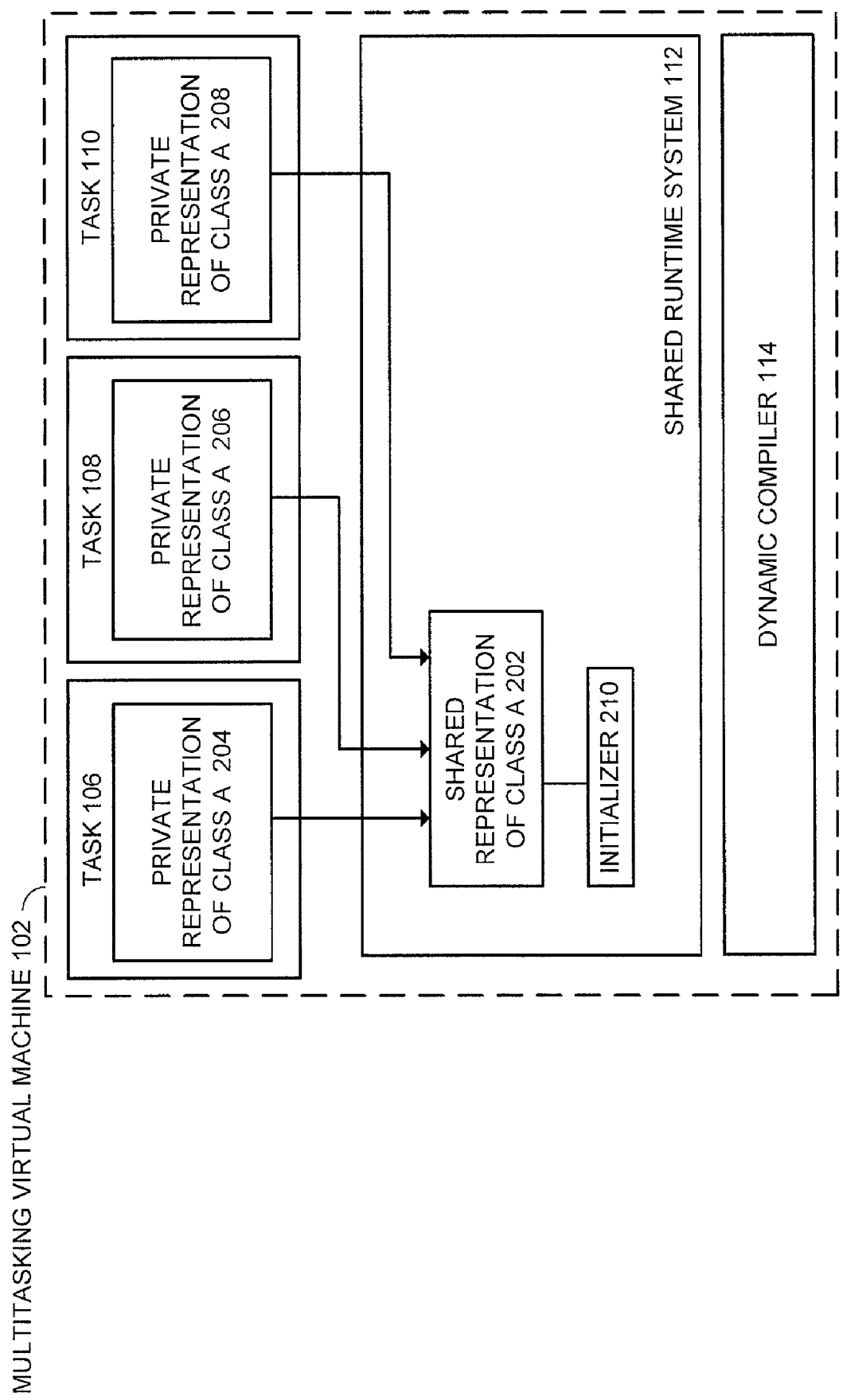
FIG. 2 illustrates multitasking virtual machine 102 in accordance with an embodiment of the present invention.

FIG. 2 illustrates multitasking virtual machine 102 in accordance with an embodiment of the present invention. Multitasking virtual machine 102 includes shared runtime system 112, tasks 106, 108, and 110, and dynamic compiler 114 from FIG. 1. Shared runtime system 112 includes shared representations of various classes including shared representation of class A 202. Shared runtime system 112 also includes initializer 210. Tasks 106, 108, and 110 include task-private representation of class A 204, 206, and 208, respectively.

Shared representation of class A 202 includes constant pools, methods, fields, exception tables, and the like, which are shared by the tasks executing within multitasking virtual machine 102. Task private representation of class A 204, 206, and 208 include static variables, class initialization states, class loader objects, and the like that are private to tasks 106, 108, and 110, respectively.

Initializer 210 is a variable associated with shared representation of class A 202. The function, and possible values, of initializer 210 was covered in detail above in the overview of the present invention.

Dynamic compiler 114 compiles platform-independent codes into the native code for computing device 100. In operation, multitasking virtual machine 102 determines when a method of a class is being used sufficiently often so that the cost of compiling the platform-independent code into native code for computing device 100 can be recovered by the increased performance of the native code.

Removing Class Initialization Barriers From Compiled Code

Figure 3:
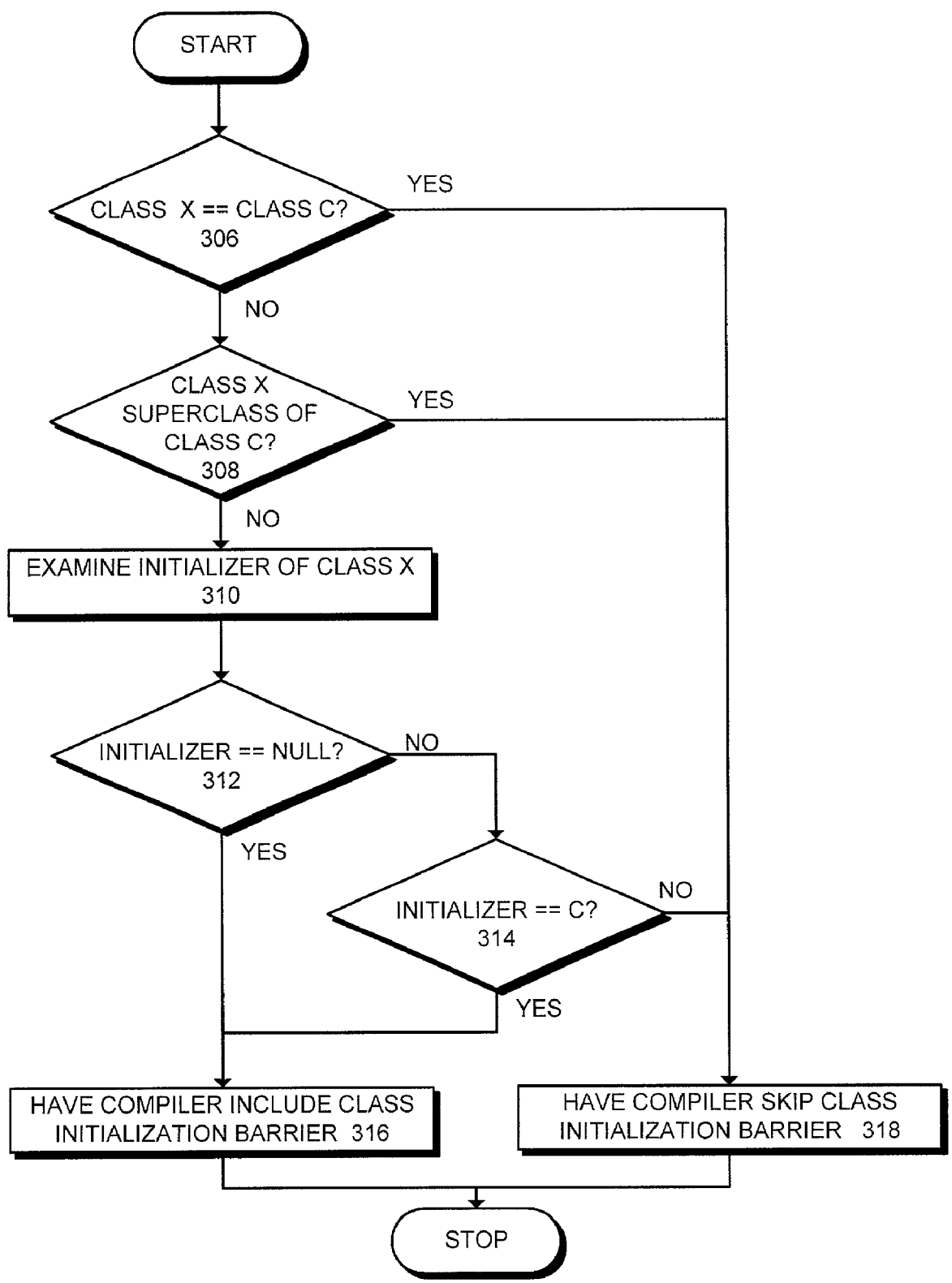
FIG. 3 is a flowchart illustrating the process of determining whether native code for a class initialization barrier should be generated by the dynamic compiler in accordance with an embodiment of the present invention.

FIG. 3 is a flowchart illustrating the process of determining whether native code for a class initialization barrier should be generated by the dynamic compiler in accordance with an embodiment of the present invention. The system starts when dynamic compiler 114 processes a platform-independent instruction from the platform-independent code stream for a method M of a class C, wherein the instruction may trigger the initialization of a class X. In the JAVA programming system there are four such instructions: getstatic, putstatic, new, and invokestatic.

Next, dynamic compiler 114 determines if class X and class C are the same (step 306). If so, the process proceeds to step 318, otherwise the process proceeds to step 308.

At step 308, dynamic compiler 114 determines if class X is a superclass of class C (step 308). If so, the process proceeds to step 318, otherwise the process proceeds to step 310.

At step 310, dynamic compiler 114 examines initializer 210 of class X (step 310). Next, dynamic compiler determines if initializer 210 is NULL (step 312). If so, the process proceeds to step 316, otherwise the process proceeds to step 314.

At step 314, dynamic compiler 114 determines if initializer 210 is equal to class C (step 314). If so, the process proceeds to step 316, otherwise the process proceeds to step 318.

At step 316, dynamic compiler 114 is instructed to generate native code for a class initialization barrier targeted at class X. At step 318, dynamic compiler 114 is instructed to skip the generation of native code for a class initialization barrier.

Alternate Method of Removing Class Initialization Barriers

Figure 4:
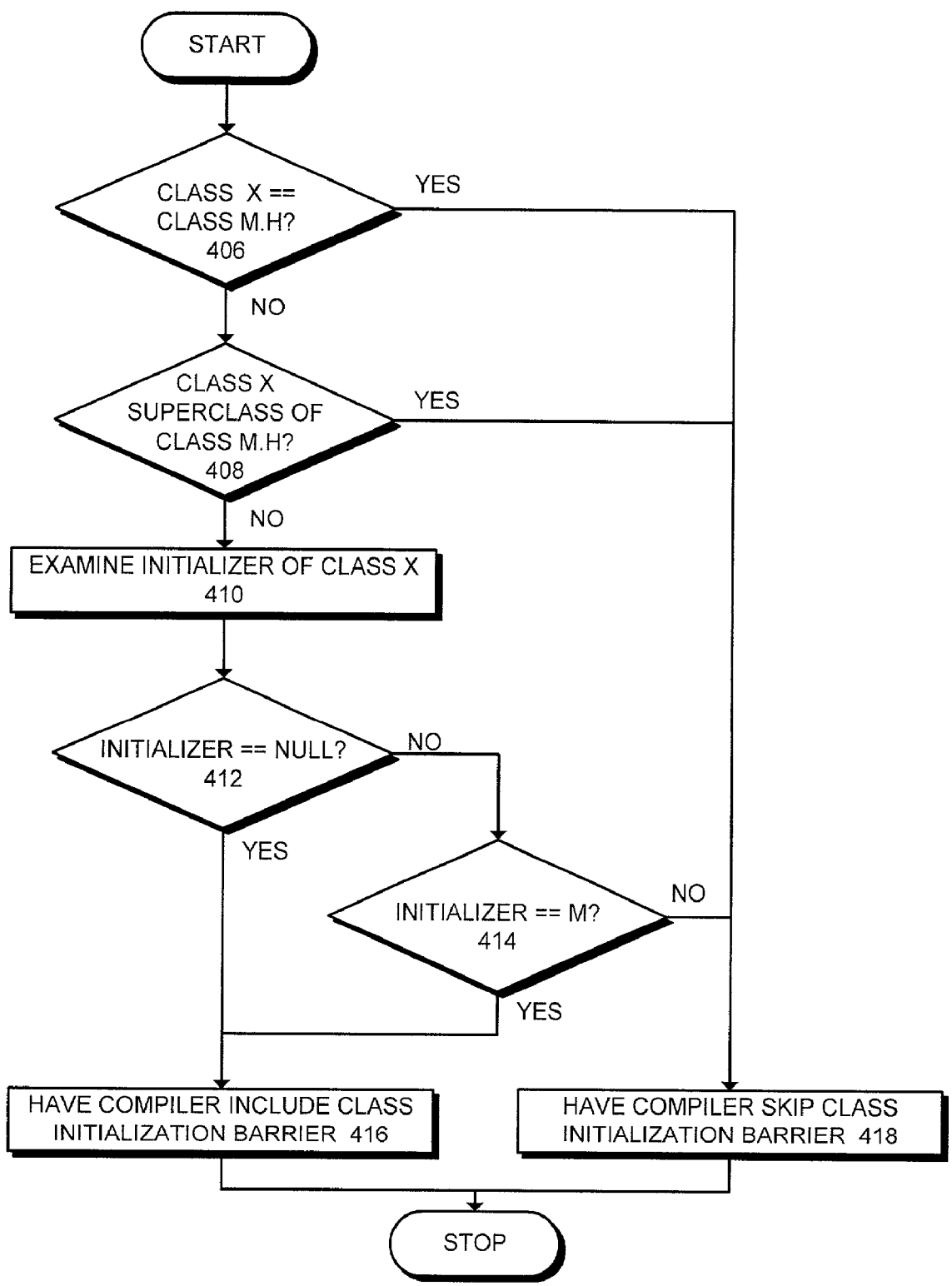
FIG. 4 is a flowchart illustrating the process of determining whether native code for a class initialization barrier should be generated by the dynamic compiler in accordance with an embodiment of the present invention.

FIG. 4 is a flowchart illustrating the process of determining whether native code for a class initialization barrier should be generated by the dynamic compiler in accordance with an embodiment of the present invention. The system starts when dynamic compiler 114 processes a platform-independent instruction from the platform-independent code stream for a method M of a class C, wherein the instruction may trigger the initialization of a class X. In the JAVA programming system there are four such instructions: getstatic, putstatic, new, and invoke static.

Next, dynamic compiler 114 determines if class X and class M.H, the class that defines method M, are the same (step 406). If so, the process proceeds to step 418, otherwise the process proceeds to step 408.

At step 408, dynamic compiler 114 determines if class X is a superclass of class M.H, the class that defines method M (step 408). If so, the process proceeds to step 418, otherwise the process proceeds to step 410.

At step 410, dynamic compiler 114 examines initializer 210 of class X (step 410). Next, dynamic compiler 114 determines if initializer 210 is NULL (step 412). If so, the process proceeds to step 416, otherwise the process proceeds to step 414.

At step 414, dynamic compiler 114 determines if initializer 210 is equal to method M (step 414). If so, the process proceeds to step 416, otherwise the process proceeds to step 418.

At step 416, dynamic compiler 114 is instructed to generate native code for a class initialization barrier targeted at class X. At step 418, dynamic compiler 114 is instructed to skip the generation of native code for a class initialization barrier.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to indicate to a dynamic compiler of a multitasking virtual machine when the dynamic compiler can skip generating native code for a class initialization barrier when compiling a program method, wherein a runtime representation of classes by the multitasking virtual machine includes a shared runtime data structure that is shared by multiple tasks, and wherein a native code produced by the dynamic compiler extends the shared runtime data structure representing classes and can be executed serially or concurrently by multiple tasks of the multitasking virtual machine, the method comprising:

augmenting the shared runtime data structure with an initializer field, wherein the shared runtime data structure represents a shared part of a class, and wherein the initializer field is a variable; and using the value of the initializer field of the class to determine whether a platform-independent instruction of the program method may trigger an initialization of the class.

2. The method of claim 1, further comprising initializing a bootstrap class, wherein the bootstrap class is initialized during startup of a task of the multitasking virtual machine, and before any concurrency, due to creation of multiple threads of control within the task, takes place.

3. The method of claim 2, further comprising assigning a value of an initializer of the class when the class is fully initialized, wherein the value includes an indication that one of:

the class is not the bootstrap class, the class is the bootstrap class and the value of the initializer identifies a holder of the class initialization barrier that triggered the initialization of the class, and the class is the bootstrap class and the value of the initializer further indicates that the class initialization was not triggered by a class initialization barrier.

4. The method of claim 3, further comprising:

setting a binary variable to zero upon starting the multitasking virtual machine; and setting the binary variable to one when all bootstrap classes have been initialized by a first task executed by the multitasking virtual machine;

whereby the binary variable indicates to the multitasking virtual machine whether all bootstrap classes have been initialized.

5. The method of claim 4, further comprising:

upon initiating the initialization of the class from a class initialization barrier, noting the holder of the class initialization barrier; and once the class is fully initialized, assigning the holder to the initializer field only if the binary variable is zero.

6. The method of claim 3, further comprising upon setting a non-bootstrap class to a fully initialized state for a task, assigning the initializer field of the class to a constant value, wherein the constant value is distinguishable from all other possible values for the initializer field.

7. The method of claim 6, wherein the constant value is a NULL pointer.

8. The method of claim 3, wherein a pointer to a runtime data structure representing the shared part of the class is assigned to the initializer field of the class to indicate that the class is the bootstrap class whose initialization is not triggered by a class initialization barrier.

9. The method of claim 3, further comprising:

if the class does not have an initialization sequence, setting the class to a fully initialized state upon the class being loading by the task, and assigning the initializer field of the class to a pointer to a runtime data structure representing the shared part of the class.

10. The method of claim 3, further comprising instructing the dynamic compiler not to generate native code for the class initialization barrier of the program method being compiled if the class targeted by the class initialization barrier is equal to the class that defines the program method being compiled.

11. The method of claim 10, further comprising instructing the dynamic compiler not to generate native code for the class initialization barrier of the program method being compiled if the class targeted by the class initialization barrier is a superclass of the class that defines the program method being compiled.

12. The method of claim 11, wherein the value of the holder of the class initialization barrier is a pointer to a runtime data structure representing the shared part of the class that defines the program method that holds the class initialization barrier.

13. The method of claim 12, further comprising instructing the dynamic compiler not to generate native code for the class initialization barrier of the program method being compiled if the value of the initializer field of the class targeted by the class initialization barrier is:

different from the value that indicates that the class is not bootstrap class, and different from the pointer to the runtime data structure representing the shared part of the class that defines the program method being compiled.

14. The method of claim 11, wherein the value of the holder of the class initialization barrier is a pointer to the shared runtime data structure representing the program method that holds the class initialization barrier.

15. The method of claim 14, further comprising instructing the dynamic compiler not to generate native code for the class initialization barrier of the program method being compiled if the value of the initializer field of the class targeted by the class initialization barrier is:

different from the value that indicate that the class is not the bootstrap class, and different from the pointer to the shared runtime data structure representing the program method being compiled.

16. A computer-readable storage medium storing instructions that when executed by a computer cause the computer to perform a method to indicate to a dynamic compiler of a multitasking virtual machine when the dynamic compiler can skip generating native code for a class initialization barrier when compiling a program method, wherein a runtime representation of classes by the multitasking virtual machine includes a shared runtime data structure that is shared by multiple tasks, and wherein a native code produced by the dynamic compiler extends the shared runtime data structure representing classes and can be executed serially or concurrently by multiple tasks of the multitasking virtual machine, the method comprising:

augmenting the shared runtime data structure with an initializer field, wherein the shared runtime data structure represents a shared part of a class, and wherein the initializer filed is a variable; and using the value of the initializer field of the class to determine whether a platform-independent instruction of the program method may trigger an initialization of the class.

17. The computer-readable storage medium of claim 16, the method further comprising initializing a bootstrap class, wherein the bootstrap class is initialized during startup of a task of the multitasking virtual machine, and before any concurrency, due to creation of multiple threads of control within the task, takes place.

18. The computer-readable storage medium of claim 17, the method further comprising assigning a value of an initializer of the class when the class is fully initialized, wherein the value includes an indication that one of:
  the class is not the bootstrap class,
  the class is the bootstrap class and the value of the initializer identifies a holder of the class initialization barrier that triggered the initialization of the class, and
  the class is the bootstrap class and the value of the initializer further indicates that the class initialization was not triggered by a class initialization barrier.

19. The computer-readable storage medium of claim 18, the method further comprising:
  setting a binary variable to zero upon starting the multitasking virtual machine; and
  setting the binary variable to one when all bootstrap classes have been initialized by a first task executed by the multitasking virtual machine;
  whereby the binary variable indicates to the multitasking virtual machine whether all bootstrap classes have been initialized.

20. The computer-readable storage medium of claim 19, the method further comprising:
  upon initiating the initialization of the class from a class initialization barrier, noting the holder of the class initialization barrier; and
  once the class is fully initialized, assigning the holder to the initializer field only if the binary variable is zero.

21. The computer-readable storage medium of claim 18, the method further comprising upon setting a non-bootstrap class to a fully initialized state for a task, assigning the initializer field of the class to a constant value, wherein the constant value is distinguishable from all other possible values for the initializer field.

22. The computer-readable storage medium of claim 21, wherein the constant value is a NULL pointer.

23. The computer-readable storage medium of claim 18, wherein a pointer to a runtime data structure representing the shared part of the class is assigned to the initializer field of the class to indicate that the class is the bootstrap class whose initialization is not triggered by a class initialization barrier.

24. The computer-readable storage medium of claim 18, the method further comprising:
  if the class does not have an initialization sequence,
    setting the class to a fully initialized state upon the class being loading by the task, and
    assigning the initializer field of the class to a pointer to a runtime data structure representing the shared part of the class.

25. The computer-readable storage medium of claim 18, the method further comprising instructing the dynamic compiler not to generate native code for the class initialization barrier of the program method being compiled if the class targeted by the class initialization barrier is equal to the class that defines the program method being compiled.

26. The computer-readable storage medium of claim 25, the method further comprising instructing the dynamic compiler not to generate native code for the class initialization barrier of the program method being compiled if the class targeted by the class initialization barrier is a superclass of the class that defines the program method being compiled.

27. The computer-readable storage medium of claim 26, wherein the value of the holder of the class initialization barrier is a pointer to a runtime data structure representing the shared part of the class that defines the program method that holds the class initialization barrier.

28. The computer-readable storage medium of claim 27, the method further comprising instructing the dynamic compiler not to generate native code for the class initialization barrier of the program method being compiled if the value of the initializer field of the class targeted by the class initialization barrier is:
  different from the value that indicates that the class is not bootstrap class, and
  different from the pointer to the runtime data structure representing the shared part of the class that defines the program method being compiled.

29. The computer-readable storage medium of claim 26, wherein the value of the holder of the class initialization barrier is a pointer to the shared runtime data structure representing the program method that holds the class initialization barrier.

30. The computer-readable storage medium of claim 29, the method further comprising instructing the dynamic compiler not to generate native code for the class initialization barrier of the program method being compiled if the value of the initializer field of the class targeted by the class initialization barrier is:
  different from the value that indicate that the class is not the bootstrap class, and
  different from the pointer to the shared runtime data structure representing the program method being compiled.

31. An apparatus to indicate to a dynamic compiler of a multitasking virtual machine when the dynamic compiler can skip generating native code for a class initialization barrier when compiling a program method, wherein a runtime representation of classes by the multitasking virtual machine includes a shared runtime data structure that is shared by multiple tasks, and wherein a native code produced by the dynamic compiler extends the shared runtime data structure representing classes and can be executed serially or concurrently by multiple tasks of the multitasking virtual machine, comprising:
  an augmenting mechanism that is configured to augment the shared runtime data structure with an initializer field, wherein the shared runtime data structure represents a shared part of a class, and wherein the initializer field is a variable; and
  a determining mechanism that is configured to use the value of the initializer field of the class to determine whether a platform-independent instruction of the program method may trigger an initialization of the class.

32. The apparatus of claim 31, further comprising an initializing mechanism that is configured to initialize a bootstrap class, wherein the bootstrap class is initialized during startup of a task of the multitasking virtual machine, and before any concurrency, due to creation of multiple threads of control within the task, takes place.

33. The apparatus of claim 32, further comprising an assigning mechanism that is configured to assign a value of an initializer of the class when the class is fully initialized, wherein the value includes an indication that one of:
  the class is not the bootstrap class,
  the class is the bootstrap class and the value of the initializer identifies a holder of the class initialization barrier that triggered the initialization of the class, and the class is the bootstrap class and the value of the initializer further indicates that the class initialization was not triggered by a class initialization barrier.

34. The apparatus of claim 33, further comprising:

a setting mechanism that is configured to set a binary variable to zero upon starting the multitasking virtual machine;

wherein the setting mechanism is further configured to set the binary variable to one when all bootstrap classes have been initialized by a first task executed by the multitasking virtual machine;

whereby the binary variable indicates to the multitasking virtual machine whether all bootstrap classes have been initialized.

35. The apparatus of claim 34, further comprising:

an examining mechanism that is configured to note the holder of the class initialization barrier; and wherein the assigning mechanism is further configured to assigne the holder to the initializer field only if the binary variable is zero.

36. The apparatus of claim 33, wherein the assigning mechanism is further configured to assign the initializer field of the class to a constant value, wherein the constant value is distinguishable from all other possible values for the initializer field.

37. The apparatus of claim 36, wherein the constant value is a NULL pointer.

38. The apparatus of claim 33, wherein a pointer to a runtime data structure representing the shared part of the class is assigned to the initializer field of the class to indicate that the class is the bootstrap class whose initialization is not triggered by a class initialization barrier.

39. The apparatus of claim 33, further comprising a setting mechanism that is configured to set the class to a fully initialized state upon the class being loading by the task; and wherein the assigning mechanism is further configured to assign the initializer field of the class to a pointer to a runtime data structure representing the shared part of the class.

40. The apparatus of claim 33, further comprising an instructing mechanism that is configured to instruct the dynamic compiler not to generate native code for the class initialization barrier of the program method being compiled if the class targeted by the class initialization barrier is equal to the class that defines the program method being compiled.

41. The apparatus of claim 40, wherein the instructing mechanism is further configured to instruct the dynamic compiler not to generate native code for the class initialization barrier of the program method being compiled if the class targeted by the class initialization barrier is a superclass of the class that defines the program method being compiled.

42. The apparatus of claim 41, wherein the value of the holder of the class initialization barrier is a pointer to a runtime data structure representing the shared part of the class that defines the program method that holds the class initialization barrier.

43. The apparatus of claim 42, wherein the instructing mechanism is further configured to instruct the dynamic compiler not to generate native code for the class initialization barrier of the program method being compiled if the value of the initializer field of the class targeted by the class initialization barrier is:

different from the value that indicates that the class is not bootstrap class, and different from the pointer to the runtime data structure representing the shared part of the class that defines the program method being compiled.

44. The apparatus of claim 41, wherein the value of the holder of the class initialization barrier is a pointer to the shared runtime data structure representing the program method that holds the class initialization barrier.

45. The apparatus of claim 44, wherein the instructing mechanism is further configured to instruct the dynamic compiler not to generate native code for the class initialization barrier of the program method being compiled if the value of the initializer field of the class targeted by the class initialization barrier is:

different from the value that indicate that the class is not the bootstrap class, and different from the pointer to the shared runtime data structure representing the program method being compiled.

* * * * *

UNITED STATES PATENT AND TRADEMARK OFFICE
CERTIFICATE OF CORRECTION

| | | |
|---|---|---|
| PATENT NO. | : 7,065,755 B2 | Page 1 of 1 |
| APPLICATION NO. | : 10/010057 | |
| DATED | : June 20, 2006 | |
| INVENTOR(S) | : Laurent P. Daynes et al. | |

It is certified that error appears in the above-identified patent and that said Letters Patent is hereby corrected as shown below:

In claim 16 (at column 12, line 61), please delete the word, "filed" and replace with the word --field--.

Signed and Sealed this

Twelfth Day of September, 2006

JON W. DUDAS
*Director of the United States Patent and Trademark Office*